United States Patent
Leo et al.

(10) Patent No.: US 10,252,234 B2
(45) Date of Patent: Apr. 9, 2019

(54) SYNCHRONOUS SINGLE- AND DOUBLE-ACTING PISTON FEEDER SYSTEM AND METHOD

(71) Applicant: ThermoChem Recovery International, Inc., Baltimore, MD (US)

(72) Inventors: Daniel Michael Leo, Baltimore, MD (US); Hamilton Sean Michael Whitney, Baltimore, MD (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 833 days.

(21) Appl. No.: 14/775,153

(22) PCT Filed: Apr. 10, 2013

(86) PCT No.: PCT/US2013/035945
§ 371 (c)(1),
(2) Date: Sep. 11, 2015

(87) PCT Pub. No.: WO2014/168615
PCT Pub. Date: Oct. 16, 2014

(65) Prior Publication Data
US 2016/0030903 A1    Feb. 4, 2016

(51) Int. Cl.
*B30B 1/32* (2006.01)
*B30B 9/28* (2006.01)
(Continued)

(52) U.S. Cl.
CPC ............. *B01J 8/002* (2013.01); *B01J 8/003* (2013.01); *B01J 8/0035* (2013.01); *B01J 8/0045* (2013.01);
(Continued)

(58) Field of Classification Search
CPC .... B30B 1/32; B30B 9/28; B30B 9/30; B30B 9/3057; B30B 9/3007; B30B 9/3014;
(Continued)

(56) References Cited

U.S. PATENT DOCUMENTS 2,192,778 A    11/1935  Stacy
2,616,265 A    8/1949   Wilson
(Continued)

FOREIGN PATENT DOCUMENTS

| CN | 101653994 | 2/2010 |
| CN | 102642322 | 8/2012 |
| WO | WO 00/76757 | 12/2000 |

OTHER PUBLICATIONS

Office Action dated Apr. 26, 2016 issued in Chinese counterpart application (No. 201380077290.3).
(Continued)

*Primary Examiner* — Jimmy T Nguyen
(74) *Attorney, Agent, or Firm* — Womble Bond Dickinson (US) LLP

(57) ABSTRACT

A mechanism applies necessary forces for the creation of one or more plugs of compressible material to be supplied to a reactor. The plugs are capable of forming a seal between inlets for the plugs and the reactor. The mechanism includes two double-acting hydraulic piston cylinder assemblies coupled with two single-acting hydraulic piston cylinder assemblies.

12 Claims, 2 Drawing Sheets

(51) Int. Cl.
    *B30B 9/32*   (2006.01)
    *B01J 8/00*   (2006.01)
    *B01J 8/24*   (2006.01)
    *B30B 9/30*   (2006.01)
    *B01J 8/18*   (2006.01)
(52) U.S. Cl.
    CPC . *B01J 8/18* (2013.01); *B01J 8/24* (2013.01); *B30B 1/32* (2013.01); *B30B 9/28* (2013.01); *B30B 9/3057* (2013.01); *B30B 9/3092* (2013.01); *B30B 9/328* (2013.01); *B01J 2208/00752* (2013.01); *B01J 2208/00769* (2013.01)
(58) Field of Classification Search
    CPC ... B30B 9/3039; B30B 9/3092; B30B 9/3078; B30B 9/327; B30B 9/328; B01J 8/24; B01J 8/18; B01J 8/002; B01J 8/003; B01J 8/0035; B01J 8/0045; B01J 2208/00752; B01J 2208/00769
    USPC ..................................... 100/269.01, 269.06
    See application file for complete search history.

(56) References Cited

U.S. PATENT DOCUMENTS

| | | | |
|---|---|---|---|
| 3,554,117 A | | 1/1971 | Goldkuhle |
| 3,858,504 A | * | 1/1975 | Boyer ................... B09B 3/0025 100/107 |
| 3,872,784 A | * | 3/1975 | Kaszuba ............... B30B 9/3092 100/209 |
| 4,283,929 A | | 8/1981 | Heiberger |
| 4,759,280 A | | 7/1988 | Malashenko |
| 5,524,534 A | * | 6/1996 | Dietel ................... B30B 9/3007 100/209 |
| 2002/0062676 A1 | | 5/2002 | Yashima et al. |
| 2009/0130003 A1 | | 5/2009 | Koch et al. |
| 2011/0011283 A1 | | 1/2011 | Burke |
| 2011/0162741 A1 | | 7/2011 | Fink et al. |
| 2012/0213647 A1 | | 8/2012 | Koch et al. |
| 2013/0313481 A1 | | 11/2013 | Perez |

OTHER PUBLICATIONS

International Search Report dated Jul. 11, 2013 issued in PCT counterpart application (No. PCT/US2013/035945).

Written Opinion dated Jul. 11, 2013 issued in PCT counterpart application (No. PCT/US2013/035945).

International Preliminary Report on Patentability (IPRP) dated Apr. 23, 2015 issued in PCT counterpart application (No. PCT/US2013/035945).

\* cited by examiner

SYNCHRONOUS SINGLE- AND DOUBLE-ACTING PISTON FEEDER SYSTEM AND METHOD

RELATED APPLICATIONS

This is a 35 USC 371 U.S. National Phase of International Application No. PCT/US2013/035495, filed 10 Apr. 2013 and published in English as WO 2014/168615A1 on 16 Oct. 2014. The contents of the aforementioned application are incorporated by reference in their entirety.

FIELD OF THE INVENTION

The present invention relates to a carbonaceous feeder mechanism which applies the necessary forces for the creation of one or more plugs of compressible material for feeding into a reactor.

BACKGROUND OF THE INVENTION

FIG. 1 shows a prior art feeding apparatus (02). Prior art feeding apparatus (02) comprises the following main components a first piston cylinder assembly (04), a second piston cylinder assembly (06), a third piston cylinder assembly (08), a first cylinder (10), a second cylinder (12), and a third cylinder (14), together with a plug disintegrator assembly (18), and a reactor feed screw assembly (22) to deliver the plugs to a reactor (104).

The first piston cylinder assembly (04) is comprised of: a first hydraulic cylinder (24), a first hydraulic cylinder front cylinder space (26), a first hydraulic cylinder rear cylinder space (28), a first hydraulic cylinder front connection port (30), a first hydraulic cylinder rear connection port (32), a first piston rod (34), a first hydraulic cylinder piston (36), a first hydraulic cylinder flange (38), and a first piston ram (40).

The first piston ram (40) is partly accommodated and arranged to travel in a reciprocating manner inside the first cylinder (10) which has associated therewith a feedstock inlet (42), a first cylinder first flange (44), and a first cylinder second flange (46). The first hydraulic cylinder flange (38) is connected to the first cylinder first flange (44).

The second piston cylinder assembly (06) is comprised of: second hydraulic cylinder (48), a second hydraulic cylinder front cylinder space (50), a second hydraulic cylinder rear cylinder space (52), a second hydraulic cylinder front connection port (54), a second hydraulic cylinder rear connection port (56), a second piston rod (58), a second hydraulic cylinder piston (60), a second hydraulic cylinder flange (62), and a second piston ram (64).

The second piston ram (64) is partly accommodated and arranged to travel in a reciprocating manner inside the second cylinder (12) which has associated with it a second cylinder first flange (66), a second cylinder second flange (68), a second cylinder third flange (70), and a cylindrical second pipe branch opening (72). The second hydraulic cylinder flange (62) is connected to the second cylinder first flange (66).

The first cylinder second flange (46) is connected to the second cylinder third flange (70) so as to allow a carbonaceous feedstock to be transferred through the first cylinder (10) by the advancing motion of the first piston ram (40) and partially compressed into the second cylinder (12) through the cylindrical second pipe branch opening (72).

The third piston cylinder assembly (08) is comprised of: third hydraulic cylinder (74), a third hydraulic cylinder front cylinder space (76), a third hydraulic cylinder rear cylinder space (78), a third hydraulic cylinder front connection port (80), a third hydraulic cylinder rear connection port (82), a third piston rod (84), a third hydraulic cylinder piston (86), a third hydraulic cylinder flange (88), and a third piston ram (90).

The third piston ram (90) is partly accommodated and arranged to travel in a reciprocating manner inside the third cylinder (14) which has associated with it a third cylinder first flange (92), a third cylinder second flange (94), a third cylinder third flange (96), and a cylindrical third pipe branch opening (98). The third hydraulic cylinder flange (88) is connected to the third cylinder first flange (92).

The second cylinder second flange (68) is connected to the third cylinder third flange (96) so as to allow a carbonaceous feedstock to be transferred through the second cylinder (12) by the advancing motion of the second piston ram (64) and partially compressed into the third cylinder (14) through the cylindrical third pipe branch opening (98).

After loose carbonaceous feedstock is transferred to the third cylinder (14) from the advancing motion of the second piston ram (64), the feedstock is then advanced through the third cylinder (14) by the advancing motion of the third piston ram (90) where it is compressed to develop a plug (100) of defined length and pressure to form the seal between the pressurized thermochemical reactor (104) and the feedstock inlet (42), which may be exposed to the atmosphere.

As seen in FIG. 1, the plug forms the primary seal between the pressurized thermochemical reactor (104) and the feedstock inlet (42). One of the three pistons is always in a closed position, which prevents a plug blow-out if the plug becomes unstable and provides additional safety against syngas leaks. L1 and L2 indicate the stroke starting position (L1) and maximum stroke length position (L2), respectively, of terminal plug-forming end of the third piston ram (90). In a preferred configuration, the compressible material is pressed to form a plug with a pressure of 10-1000 bars by the advancing movement of the third piston ram (90).

As plugs are successively formed they are transferred to a plug disintegrator assembly (18) which breaks up the formed plug for transference into the fluidized bed (102) of the pressurized thermochemical reactor (104) via a reactor feed screw assembly (22).

U.S. Pat. No. 7,964,004 shows an assembly which includes three single-acting pistons for use in a system of the sort seen in FIG. 1.

SUMMARY OF THE INVENTION

In one aspect, the present invention is directed to a feeder apparatus for advancing compressible material. The feeder apparatus has two double-acting hydraulic piston cylinder assemblies coupled with two single-acting hydraulic piston cylinder assemblies.

The feeder apparatus may include:

a double-acting first piston cylinder assembly including a first hydraulic cylinder having first and second first piston rams arranged to travel in opposite directions within respective first and second first cylinders, each first cylinder having a feedstock inlet;

first and second single-acting second piston cylinder assemblies, each including a second hydraulic cylinder having a corresponding second piston ram arranged to travel in respective first and second second cylinders, each second cylinder having a second pipe branch opening coupled to a respective one of the first and second first cylinders; and a double-acting third piston cylinder assembly including a third hydraulic cylinder having first and second third piston rams arranged to travel in opposite directions within respective first and second third cylinders, each third cylinder having a third pipe branch opening coupled to a respective one of the first and second second cylinders.

In another aspect, the present invention is directed to a method of applying necessary forces for the creation of one or more plugs of compressible material for feeding into a reactor, using the above-described feeder apparatus.

The method may include:

providing the above-identified feeder apparatus;

conveying the compressible material from the first cylinders to the second cylinders in response to forward and rearward movement of the double-acting first piston cylinder assembly;

conveying the compressible material from the second cylinders to the third cylinders in response to alternating forward movement of the single-acting second piston cylinder assemblies; and conveying the compressible material from the third cylinders, in response to forward and rearward movement of the double-acting third piston cylinder assembly.

BRIEF DESCRIPTION OF THE DRAWINGS

For a better understanding of the present invention and to show how the same may be carried out in practice, reference will now be made to the accompanying drawings, in which.

DETAILED DESCRIPTION

The contents of aforementioned U.S. Pat. No. 7,964,004 are incorporated by reference to the extent necessary to understand the subject matter of the present application.

Figure 2:
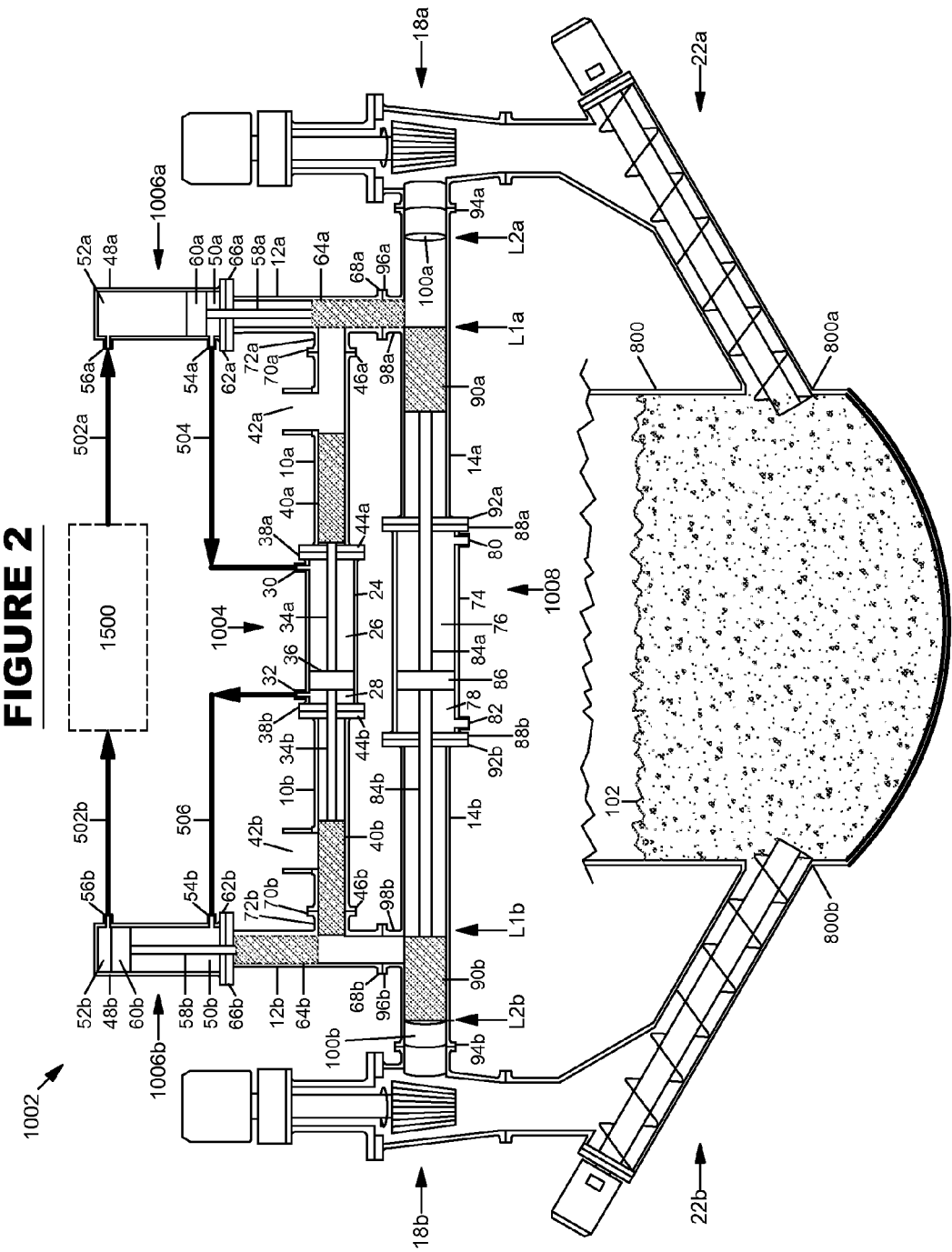
FIG. 2 is a diagrammatic representation of the present invention.

FIG. 2 shows a feeding apparatus (1002) in accordance with one embodiment of the present invention. The feeding apparatus (1002) is constructed of the following main components: a double-acting first piston cylinder assembly (1004), two single-acting second piston cylinder assemblies (1006a & 1006b), a double-acting third piston cylinder assembly (1008), two first cylinders (10a & 10b), two second cylinders (12a & 12b), and two third cylinders (14a & 14b), together with a plurality of plug disintegrator assemblies (18a & 18b), and a plurality of (first and second) reactor feed screw assemblies (22a & 22b).

In FIG. 2, the right-hand side of the drawing may be referred to herein as the "first" (or "a") side, while the left-hand side of the drawing may be referred to herein as the "second" (or "b") side. Many components associated with the right-hand side in FIG. 2 are assigned reference characters ending in "a" while components associated with the left-hand side are assigned reference characters ending in "b".

The double-acting first piston cylinder assembly (1004) is comprised of: a first hydraulic cylinder (24), a first hydraulic cylinder front cylinder space (26), a first hydraulic cylinder rear cylinder space (28), a first hydraulic cylinder front connection port (30), a first hydraulic cylinder rear connection port (32), two first hydraulic cylinder flanges (38a & 38b), two first piston rams (40a & 40b) connected at the terminal ends of their respective first piston rods (34a & 34b), which are connected at opposite ends of a dual-ram first hydraulic cylinder piston (36). It is understood that in the description of the first double-acting piston cylinder assembly (1004), the terms "front" and "rear" applied to the cylinder spaces (26, 28) and the connection ports (30, 32) are somewhat arbitrary and can be reversed without loss of generality. Alternatively, they may simple be considered as "first" and "second" rather than "front" and "rear".

Each first piston ram (40a & 40b) is partly accommodated and arranged to travel in a reciprocating manner inside of its respective first cylinder (10a & 10b). Each of the first cylinders has associated therewith a feedstock inlet (42a & 42b), a first cylinder first flange (44a & 44b), and a first cylinder second flange (46a & 46b). Each first hydraulic cylinder flange (38a & 38b) is connected to its respective first cylinder first flange (44a & 44b).

It is understood that feedstock delivery devices (not shown) may be configured to provide feedstock at each of the feedstock inlets (42a, 42b) only when a corresponding first piston ram (40a & 40b) is in the fully retracted position and does not block the associated feedstock inlet. Thus, feedstock alternatingly enters the first first cylinder (10a) and the second first cylinder (10b) during reciprocating action of the first piston rams (40a & 40b). Stated differently, the apparatus is configured to operate such that when one of the feedstock inlets (42a, 42b) is blocked by an associated piston ram (40a, 40b), the other of the feedstock inlets (42a, 42b) is configured to receive feedstock, and vice versa.

Each single-acting second piston cylinder assembly (1006a & 1006b) is comprised of: a second hydraulic cylinder (48a & 48b), a second hydraulic cylinder front cylinder space (50a & 50b), a second hydraulic cylinder rear cylinder space (52a & 52b), a second hydraulic cylinder front connection port (54a & 54b), a second hydraulic cylinder rear connection port (56a & 56b), a second piston rod (58a & 58b), a second hydraulic cylinder piston (60a & 60b), a second hydraulic cylinder flange (62a & 62b), and a second piston ram (64a & 64b).

Each second piston ram (64a & 64b) is partly accommodated and arranged to travel in a reciprocating manner inside its respective second cylinder (12a & 12b). Each of the second cylinders has associated therewith a second cylinder first flange (66a & 66b), a second cylinder second flange (68a & 68b), a second cylinder third flange (70a & 70b), and a cylindrical second pipe branch opening (72a & 72b). Each second hydraulic cylinder flange (62a & 62b) is connected to its respective second cylinder first flange (66a & 66b).

Each first cylinder second flange (46a & 46b) is connected to its respective second cylinder third flange (70a & 70b) so as to allow a carbonaceous feedstock to be transferred through a first cylinder (10a & 10b) by the advancing motion of a first piston ram (40a & 40b) and partially compressed into a second cylinder (12a & 12b) through a cylindrical second pipe branch opening (72a & 72b).

It is understood that either one of the first piston rams (40a & 40b) advances the partially compressed feedstock into its corresponding second cylinder (12a & 12b) only when the corresponding second piston ram (64a & 64b) is in its fully retracted position. Thus, the partially compressed material alternatingly enters the first second cylinder (12a) and the second second cylinder (12b), in accordance with the position of the second piston rams (64a, 64b). As seen in FIG. 2, while second second piston ram (64b) is in the fully retracted position thus leaving the second second pipe branch opening (72b) open, the first second piston ram (64a)

is in the fully deployed position, thereby blocking the first second pipe branch opening (72a).

The double-acting third piston cylinder assembly (1008) is comprised of: a third hydraulic cylinder (74), third hydraulic cylinder front cylinder space (76), a third hydraulic cylinder rear cylinder space (78), a third hydraulic cylinder front connection port (80), a third hydraulic cylinder rear connection port (82), two third hydraulic cylinder flanges (88a & 88b), two third piston rams (90a & 90b) connected at the terminal ends of their respective third piston rods (84a & 84b), which are connected at opposite ends of a third hydraulic cylinder piston (86).

It is understood that in the description of the third double-acting piston cylinder assembly (1008), the terms "front" and "rear" applied to the cylinder spaces (76, 78) and the connection ports (80, 82) are somewhat arbitrary and can be reversed without loss of generality. Alternatively, they may simple be considered as "first" and "second" rather than "front" and "rear".

Each third piston ram (90a & 90b) is partly accommodated and arranged to travel in a reciprocating manner inside its respective third cylinder (14a & 14b). Each of the third cylinders has associated therewith a third cylinder first flange (92a & 92b), a third cylinder second flange (94a & 94b), a third cylinder third flange (96a & 96b), and a cylindrical third pipe branch opening (98a & 98b). Each third hydraulic cylinder flange (88a & 88b) is connected to its respective third cylinder first flange (92a & 92b).

Each second cylinder second flange (68a & 68b) is connected to its respective third cylinder third flange (96a & 96b) so as to allow a carbonaceous feedstock to be transferred through a second cylinder (12a & 12b) by the advancing motion of a second piston ram (64a & 64b) and partially compressed into a corresponding third cylinder (14a & 14b) through a cylindrical third pipe branch opening (98a & 98b).

After pre-compressed carbonaceous feedstock is transferred to each third cylinder (14a & 14b) from the advancing motion of its respective second piston ram (64a & 64b), the feedstock is then advanced through a third cylinder (14a & 14b) by the advancing motion of a third piston ram (90a & 90b) where it is compressed to develop a plug (100a & 100b) of defined length and pressure to form the seal between the pressurized thermochemical reactor (800) and the feedstock inlets (42a & 42b) which may be exposed to the atmosphere.

As plugs are successively formed they are transferred to the plug disintegrator assemblies (18a & 18b) which break up the formed plug into disintegrated plugs for transference into the fluidized bed (102) of the pressurized thermochemical reactor (800). Specifically, the disintegrated plugs are transported into the reactor (800) via the reactor feed screw assemblies (22a & 22b) and reactor inlet ports (802a, 802b) of the reactor (800). To facilitate formation of the plugs (100a, 100b), a terminal portion of the third cylinders (14a, 14b) may be provided with a tapered member positioned immediately before plug disintegrator assemblies (18a & 18b).

First and second source fluid transfer lines (502a & 502b) connect a pressurized source of hydraulic fluid (1500), with the second hydraulic cylinder rear cylinder spaces (52a & 52b) of the respective single-acting second piston cylinder assemblies (1006a & 1006b).

First inter-cylinder fluid transfer line (504) connects the second hydraulic cylinder front cylinder space (50a) with the first hydraulic cylinder front connection port (30). This allows hydraulic fluid to be displaced from the second hydraulic cylinder front cylinder space (50a) to the first hydraulic cylinder front cylinder space (26), or vice-versa.

A second inter-cylinder fluid transfer line (506) connects the second hydraulic cylinder front connection port (54b) with the first hydraulic cylinder rear connection port (32). This allows hydraulic fluid to be displaced from the second hydraulic cylinder front cylinder space (50b) to the first hydraulic cylinder rear cylinder space (28), or vice-versa.

A rearward stroke of the first hydraulic cylinder piston (36) minimizes the volume of hydraulic fluid within the first hydraulic cylinder rear cylinder space (28). Accordingly, a frontward stroke of the first hydraulic cylinder piston (36) minimizes the volume of hydraulic fluid within the first hydraulic cylinder front cylinder space (26).

A rearward stroke of the third hydraulic cylinder piston (86) minimizes the volume of hydraulic fluid within the third hydraulic cylinder rear cylinder space (78). Accordingly, a frontward stroke of the third hydraulic cylinder piston (86) minimizes the volume of hydraulic fluid within the third hydraulic cylinder front cylinder space (76). It is noted here that the terms "forward" and "rearward", as applied to the strokes of first and third hydraulic cylinder pistons (36, 86) are somewhat arbitrary, and that they may instead be regarded as "first" and "second".

Reference characters L1a and L2a indicate the stroke starting positions (L1a) and maximum stroke length position (L2a), respectively, for the first terminal plug-forming end of the third piston ram (90a), while L1b and L2b indicate the stroke starting positions (L1b) and maximum stroke length position (L2b), respectively, for the second terminal plug-forming end of the third piston ram (90b). As is understood from FIG. 2, when first terminal plug-forming end of the first third piston ram (90a) is at the stroke starting positions (L1a), the second terminal plug-forming end of the second third piston ram (90b) is at the maximum stroke length position (L2b), and vice versa. Thus, while first third piston ram (90a) is in the retracted position thus leaving open the first third pipe branch opening (98a) and being spaced apart from the first plug (100a), the second third piston ram (90b) is in the fully deployed position, thereby blocking the second third pipe branch opening (98b) while pushing the second plug 100a towards the second disintegrator assembly 18b.

An advancing stroke of either second hydraulic cylinder piston (60a & 60b) minimizes the volume of hydraulic fluid within that second hydraulic cylinder's front cylinder space (50a & 50b). Accordingly, a retracting stroke of either second hydraulic cylinder piston (60a & 60b) minimizes the volume of hydraulic fluid within that second hydraulic cylinder's rear cylinder space (52a & 52b).

In order to assure continuous operation of the disclosed feeder system and method, the functional control thereof, according to the present invention is such that approximately equal quantities of hydraulic fluid are withdrawn from the working cylinder spaces of interconnected double-acting first piston cylinder assembly (1004) and single-acting second piston cylinder assemblies (1006a & 1006b).

A synchronous multi-stage master and slave hydraulic fluid delivery system and method may be realized by supplying a pressurized source of hydraulic fluid to either of the second hydraulic cylinder rear connection ports (56a & 56b). For example, realization of a synchronized advancement stroke of the second hydraulic cylinder piston (60a) can be achieved with a simultaneous retracting stroke of the other second hydraulic cylinder piston (60b) by the hydraulic integration of an interposed rearward stroke of the first hydraulic cylinder piston (36) therebetween.

A scheme to accomplish a synchronous advancement stroke within the single-acting second piston cylinder assembly (1006a), rearward stroke within the double-acting first piston cylinder assembly (1004), and retracting stroke within the other single-acting second piston cylinder assembly (1006b) is as follows:

Pressurization of the second hydraulic cylinder rear cylinder space (52a) displaces hydraulic fluid from within the second hydraulic cylinder front cylinder space (50a) which travels through the first inter-cylinder fluid transfer line (504) and into the first hydraulic cylinder front cylinder space (26).

Pressurization of the first hydraulic cylinder front cylinder space (26) displaces hydraulic fluid from within the first hydraulic cylinder rear cylinder space (28) which travels through second inter-cylinder fluid transfer line (506) and into the second hydraulic cylinder front cylinder space (50b).

Accordingly, pressurization of the second hydraulic cylinder front cylinder space (50b) displaces hydraulic fluid from the second hydraulic cylinder rear cylinder space (52b) back into the pressurized source of hydraulic fluid (1500).

Generally speaking, the feedstock comprises compressible material, usually having some moisture content. After entry into inlets (42, 42b), the compressible material is transported by first piston rams (40a, 40b) through a downstream portion of the first cylinders (10a, 10b) into the second cylinders (12a, 12b). The second piston rams (64a, 64b) then transport the feedstock through a downstream portion of the second cylinders (12a, 12b) into the third cylinders (14a, 14b). The third piston rams (90a, 90b) then transport the feedstock through a downstream portion of the third cylinders (14a, 14b), compressing the feedstock into a plug (100a, 100b) which is provided to the plug disintegrator assembly (18a, 18b). By the end of this process, the feedstock is converted into a state (the plug) such that a pressure seal is formed between the feedstock inlets (42a, 42b) and the reactor inlets (802a, 802b) of the reactor (800). Thus, at least the third piston rams (90a, 90b) compresses the compressible material received into their respective third cylinders (12a, 12b), thereby increasing the density of the received compressible material. It is understood that the first piston rams (40a, 40b) and the second piston rams (64a, 64b) may also compress and increase the density of the compressible material received into their respective cylinders.

The feeding apparatus (1002) seen in FIG. 2 is intended to have all elements of the double-acting first piston cylinder assembly (1004) and the double-acting third piston cylinder assembly (1008) operational. However, there may be instances in which a portion of either the first or the third piston cylinder assembly (1004, 1008) might not be functioning properly. And since the first and the third hydraulic cylinder pistons (36, 86) and other components are coupled, this can mean that the entire feeding apparatus (1002) would be non-operational. In such case, the first and/or the third piston cylinder assemblies (1004, 1008) may be removed, at their respective flanges from the remainder of the apparatus, and replaced before resuming operation of the system. Alternatively, the first and the third piston cylinder assemblies (1004, 1008) may be removed and "single-acting" first and third assemblies may be installed on one of the two sides to continue operation. It is understood that appropriate changes to the pressure transfer lines (502a, 502b) and the inter-cylinder transfer lines (504, 506), through additional connections and/or valving changes, will be required in such an alternative case.

Figure 1:
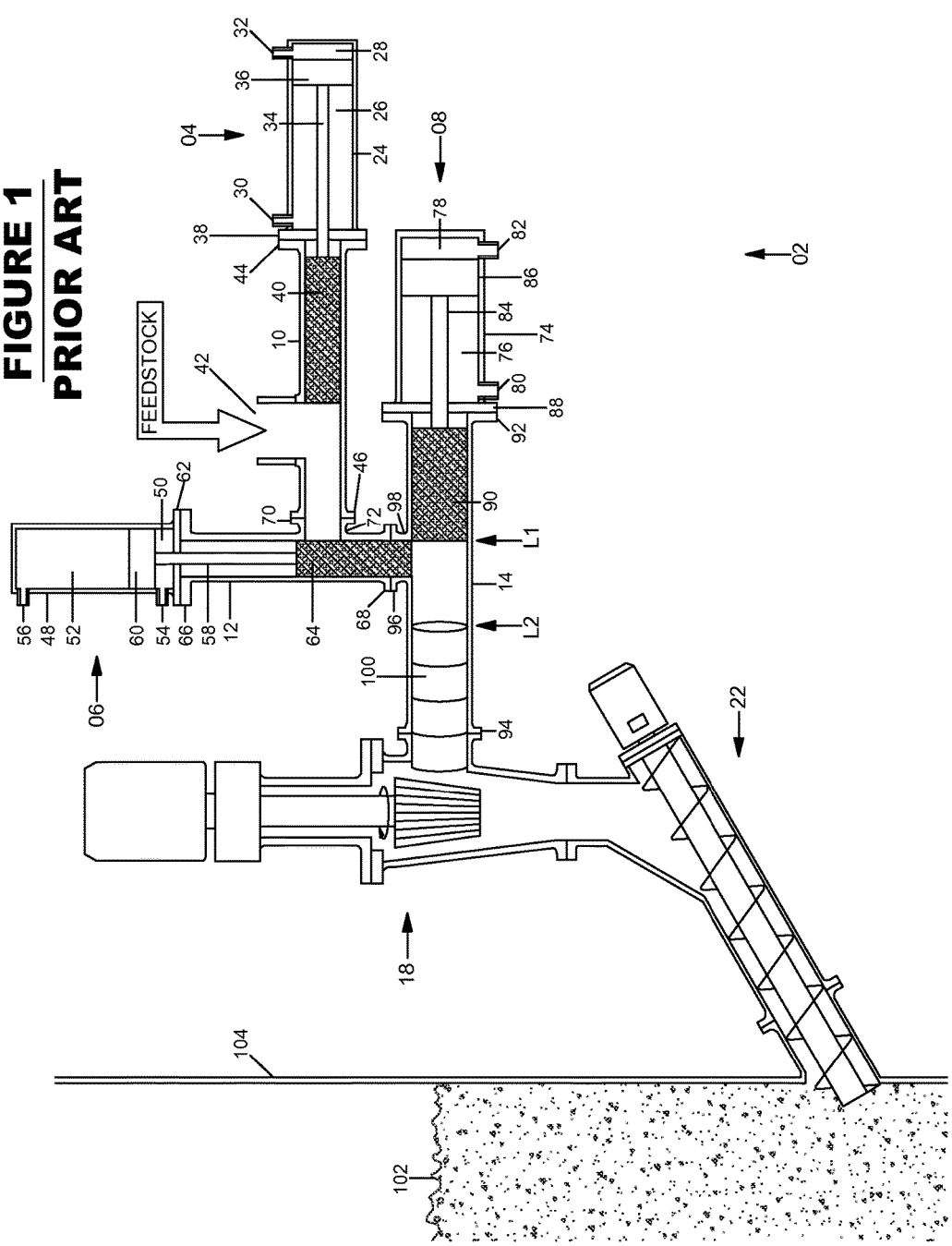
FIG. 1 is a diagrammatic representation of the prior art plug feeder system.

By providing the reactor (800) with a plurality of inlet ports (802a, 802b), each inlet port receiving disintegrated plugs, better distribution and mixing of reactants may be realized in the reactor 800. In addition, due to efficiencies of smaller scale in hydraulics, the feeding apparatus (1002) can achieve the same feedstock throughput as the prior art apparatus seen in FIG. 1, but with reduced energy consumption.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

TABLE OF REFERENCE NUMERALS stroke starting position (L1, L1a, L1b)
maximum stroke length position (L2, L2a, L2b)
feeding apparatus (02)
first piston cylinder assembly (04)
second piston cylinder assembly (06)
third piston cylinder assembly (08)
first cylinder (10)
first cylinders (10a & 10b)
second cylinder (12)
second cylinders (12a & 12b)
third cylinder (14)
third cylinders (14a & 14b)
plug disintegrator assembly (18)
plug disintegrator assemblies (18a & 18b)
reactor feed screw assembly (22)
reactor feed screw assemblies (22a & 22b)
first hydraulic cylinder (24)
first hydraulic cylinder front cylinder space (26)
first hydraulic cylinder rear cylinder space (28)
first hydraulic cylinder front connection port (30)
first hydraulic cylinder rear connection port (32)
first piston rod (34)
first piston rods (34a & 34b)
first hydraulic cylinder piston (36)
first hydraulic cylinder flange (38)
first hydraulic cylinder flanges (38a & 38b)
first piston ram (40)
first piston rams (40a & 40b)
feedstock inlet (42)
feedstock inlet (42a & 42b)
first cylinder first flange (44)
first cylinder first flange (44a & 44b)
first cylinder second flange (46)
first cylinder second flange (46a & 46b)
second hydraulic cylinder (48)
second hydraulic cylinder (48a & 48b)
second hydraulic cylinder front cylinder space (50)
second hydraulic cylinder front cylinder space (50a & 50b)
second hydraulic cylinder rear cylinder space (52)
second hydraulic cylinder rear cylinder space (52a & 52b)
second hydraulic cylinder front connection port (54)
second hydraulic cylinder front connection port (54a & 54b)
second hydraulic cylinder rear connection port (56)
second hydraulic cylinder rear connection port (56a & 56b)
second piston rod (58)
second piston rod (58a & 58b)
second hydraulic cylinder piston (60)
second hydraulic cylinder piston (60a & 60b)
second hydraulic cylinder flange (62)
second hydraulic cylinder flange (62a & 62b)
second piston ram (64)
second piston ram (64a & 64b)
second cylinder first flange (66)
second cylinder first flange (66a & 66b)
second cylinder second flange (68)
second cylinder second flange (68a & 68b)
second cylinder third flange (70)
second cylinder third flange (70a & 70b)

-continued

TABLE OF REFERENCE NUMERALS cylindrical second pipe branch opening (72)
cylindrical second pipe branch opening (72a & 72b)
third hydraulic cylinder (74)
third hydraulic cylinder front cylinder space (76)
third hydraulic cylinder rear cylinder space (78)
third hydraulic cylinder front connection port (80)
third hydraulic cylinder rear connection port (82)
third piston rod (84)
third piston rods (84a & 84b)
third hydraulic cylinder piston (86)
third hydraulic cylinder flange (88)
third hydraulic cylinder flanges (88a & 88b)
third piston ram (90)
third piston rams (90a & 90b)
third cylinder first flange (92)
third cylinder first flange (92a & 92b)
third cylinder second flange (94)
third cylinder second flange (94a & 94b)
third cylinder third flange (96)
third cylinder third flange (96a & 96b)
cylindrical third pipe branch opening (98)
cylindrical third pipe branch opening (98a & 98b)
plug (100)
plug (100a & 100b)
fluidized bed (102)
thermochemical reactor (104)
transfer line (502a & 502b)
transfer line (504)
transfer line (506)
thermochemical reactor (800)
thermochemical reactor inlet ports (802a, 802b)
feeding apparatus (1002)
double-acting first piston cylinder assembly (1004)
single-acting second piston cylinder assembly (1006a & 1006b)
double-acting third piston cylinder assembly (1008)
source of hydraulic fluid (1500)

What is claimed is:

1. A feeder apparatus for advancing a compressible material, comprising:
    a double-acting first piston cylinder assembly (1004) including a first hydraulic cylinder (24) having first and second first piston rams (40a, 40b) arranged to travel in opposite directions within respective first and second first cylinders (10a, 10b), each first cylinder (10a, 10b) having a feedstock inlet (42, 42b);
    first and second single-acting second piston cylinder assemblies (1006a, 1006b), each including a second hydraulic cylinder (48a, 48b) having a corresponding second piston ram (64a, 64b) arranged to travel in respective first and second second cylinders (12a, 12b), each second cylinder (12a, 12b) having a second pipe branch opening (72a, 72b) coupled to a respective one of the first and second first cylinders (10a, 10b), such that feedstock transferred through a first cylinder (10a & 10b) by the advancing motion of a corresponding first piston ram (40a & 40b) is then transferred into a corresponding second cylinder (12a & 12b); and
    a double-acting third piston cylinder assembly (1008) including a third hydraulic cylinder (74) having first and second third piston rams (90a, 90b) arranged to travel in opposite directions within respective first and second third cylinders (14a, 14b), each third cylinder (14a, 14b) having a third pipe branch opening (98a, 98b) coupled to a respective one of the first and second second cylinders (12a, 12b).

2. The feeder apparatus according to claim 1, further comprising:
    a source of hydraulic fluid (1500);
    a first source fluid transfer line (502a) forming a first fluid path between the source of hydraulic fluid (1500) and the first second hydraulic cylinder (48a);
    a first inter-cylinder fluid transfer line (504) forming a second fluid path between the first second hydraulic cylinder (48a) and the first hydraulic cylinder (24):
    a second inter-cylinder fluid transfer line (506) forming a third fluid path between the first hydraulic cylinder (24) and the second second hydraulic cylinder (48b); and
    a second source fluid transfer line (502b) forming a fourth fluid path between the second second hydraulic cylinder (48b) and the source of hydraulic fluid (1500).

3. The feeder apparatus according to claim 1, configured to operate such that:
    when one of the feedstock inlets (42a, 42b) is blocked by an associated first piston ram (40a, 40b), the other of the feedstock inlets (42a, 42b) open and is configured to receive feedstock, and vice versa.

4. The feeder apparatus according to claim 1, wherein:
    each third cylinder (14a, 14b) is operatively connected to a respective plug disintegrator assembly (18a, 18b).

5. The feeder apparatus according to claim 4, wherein:
    each plug disintegrator assembly (18a, 18b) is connected to a reactor (800) via a respective feed screw assembly (22a, 22b), thereby forming dual paths for advancing compressible material between the feedstock inlets (42a, 42b) and the reactor (800).

6. The feeder apparatus according to claim 2, configured to operate such that:
    when one of the feedstock inlets (42a, 42b) is blocked by an associated first piston ram (40a, 40b), the other of the feedstock inlets (42a, 42b) open and is configured to receive feedstock, and vice versa.

7. The feeder apparatus according to claim 6, wherein:
    each third cylinder (14a, 14b) is operatively connected to a respective plug disintegrator assembly (18a, 18b).

8. The feeder apparatus according to claim 7, wherein:
    each plug disintegrator assembly (18a, 18b) is connected to a reactor (800) via a respective feed screw assembly (22a, 22b), thereby forming dual paths for advancing compressible material between the feedstock inlets (42a, 42b) and the reactor (800).

9. The feeder apparatus according to claim 2, wherein:
    each third cylinder (14a, 14b) is operatively connected to a respective plug disintegrator assembly (18a, 18b).

10. The feeder apparatus according to claim 9, wherein:
    each plug disintegrator assembly (18a, 18b) is connected to a reactor (800) via a respective feed screw assembly (22a, 22b), thereby forming dual paths for advancing compressible material between the feedstock inlets (42a, 42b) and the reactor (800).

11. A method for creating at least one plug of compressible material for feeding into a reactor, comprising:
    providing a feeder apparatus according to claim 1;
    conveying the compressible material from the first cylinders (10a & 10b) to the second cylinders (12a & 12b) in response to forward and rearward movement of the double-acting first piston cylinder assembly (1004);
    conveying the compressible material from the second cylinders (12a & 12b) to the third cylinders (14a & 14b) in response to alternating forward movement of the single-acting second piston cylinder assemblies (1006a & 1006b); and conveying the compressible material from the third cylinders (14a & 14b), in response to forward and rearward movement of the double-acting third piston cylinder assembly (1008).

12. The method according to claim 11, comprising simultaneously:
transferring hydraulic fluid from a source of hydraulic fluid (1500) the first second hydraulic cylinder (48a), to thereby advance a corresponding first second piston ram (64a) within the first second cylinder (12a);
transferring hydraulic fluid from the first second hydraulic cylinder (48a) to the first hydraulic cylinder (24), to thereby advance the second first piston ram (40b) within the second first cylinder (10b);
transferring hydraulic fluid from the first hydraulic cylinder (24) to the second second hydraulic cylinder (48b), to thereby retract the second second piston ram (64b) within the second second cylinder (12b); and
transferring hydraulic fluid from the second second hydraulic cylinder (12b) to the source of hydraulic fluid (1500).

* * * * *